United States Patent
Pyle

(10) Patent No.: US 7,136,101 B2
(45) Date of Patent: Nov. 14, 2006

(54) USE-CONTROLLED EXPOSURE METHOD AND SYSTEM WITH VISUAL FEEDBACK

(75) Inventor: Norman C. Pyle, Greeley, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 943 days.

(21) Appl. No.: 10/035,765

(22) Filed: Dec. 24, 2001

(65) Prior Publication Data

US 2003/0117518 A1 Jun. 26, 2003

(51) Int. Cl.
*H04N 5/222* (2006.01)
(52) U.S. Cl. .................... 348/333.01; 348/362
(58) Field of Classification Search .............. None
See application file for complete search history.

(56) References Cited

U.S. PATENT DOCUMENTS

| | | | | |
|---|---|---|---|---|
| 4,920,371 A | * | 4/1990 | Kaneko | 396/189 |
| 5,264,940 A | * | 11/1993 | Komiya et al. | 348/298 |
| 5,365,269 A | * | 11/1994 | Holmes et al. | 348/297 |
| 5,926,216 A | * | 7/1999 | Nobuoka | 348/297 |
| 6,489,992 B1 | * | 12/2002 | Savoye | 348/340 |
| 6,809,759 B1 | * | 10/2004 | Chiang | 348/211.2 |
| 2002/0012053 A1 | * | 1/2002 | Yoshida | 348/243 |
| 2005/0146623 A1 | * | 7/2005 | Juen | 348/220.1 |

* cited by examiner

*Primary Examiner*—Ngoc-Yen Vu
*Assistant Examiner*—Dillon Durnford-Geszvain

(57) ABSTRACT

A camera is provided with a mechanism for supporting a user-controlled exposure mode in which a user can control the exposure time for the picture. A user first places the camera into the user-controlled exposure mode. Then, a user initiates the picture taking process, for example, by depressing a shutter button. The user then reviews the picture on a display as the picture develops. When the picture has the desired exposure, the user terminates the picture taking process by, for example, releasing the shutter button. In this manner, the user obtains a picture with the desired exposure without the delay, additional equipment, and guesswork involved in prior art approaches.

20 Claims, 5 Drawing Sheets

USE-CONTROLLED EXPOSURE METHOD AND SYSTEM WITH VISUAL FEEDBACK

FIELD OF THE INVENTION

The present invention relates generally to digital cameras, and more particularly, to a user-controlled exposure method and system with visual feedback.

BACKGROUND OF THE INVENTION

Low light situations create difficult conditions for photographers attempting to capture a scene under these low light conditions. Low light situations typically require a long exposure time for the camera to collect enough light for a useful and pleasing image.

Photographers have used long exposure times (e.g., many seconds to many minutes) in order to collect enough light for the image to be sensed. In one approach, light meters are employed in order for the photographer to gauge approximately how long to expose the film. Unfortunately, this process involves "trial and error" and guesswork.

When a film camera is utilized, a photographer "brackets" the scene by trying several exposure times, where there is one exposure time for each frame of film. When the film is later developed, the photographer simply picks the best exposure or the best overall image. As can be appreciated, this process wastes film and does not guarantee an acceptable image. Moreover, by the time the photographer realizes that the exposure times employed are incorrect, the scene is no longer available for capture. Consequently, this approach creates missed opportunities and the inability to go back in time to re-capture the scene.

When a digital camera is utilized, the problem is lessened in that the image can typically be reviewed by the photographer at the location of the image capture without the delay of having to process the film in a darkroom. In other words, the user receives feedback from a digital camera after the image is captured. For example, a photographer can view the pictures after the photographer shoots the picture. The user can then select the best pictures and delete the remaining pictures without wasting film. In this manner, the photographer does not waste money on developing film and printing photos that are not of value to the photographer.

However, even in this second approach that uses a digital camera, the selection of a "good" exposure occurs after the fact (i.e., after the picture has been taken). In the event the picture is not "good", the scene must be re-shot in order to obtain the proper exposure. As can be appreciated, this "trial and error" method can result in missed photographic opportunities in a variety of different situations. For example, a setting moon or other scene that has changing parameters.

Accordingly, it would be desirable for there to be a mechanism that provides visual feedback to the photographer during exposure of a picture so that a photographer can control the exposure time based on the visual feedback.

Based on the foregoing, there remains a need for a user-controlled exposure method and system with visual feedback that overcomes the disadvantages set forth previously.

SUMMARY OF THE INVENTION

According to one embodiment of the present invention, a user-controlled exposure method and system with visual feedback are described.

One aspect of the present invention is the provision of a user-controlled exposure mechanism that reduces or eliminates the lost opportunities for a photographer due to incorrect exposure time.

Another aspect of the present invention is the provision of a user-controlled exposure mechanism that provides visual feedback to the photographer during the capture of a scene.

Another aspect of the present invention is the provision of a user-controlled exposure mechanism that allows a photographer to control the exposure time during the capture of a scene based on visual feedback of current exposure.

Another aspect of the present invention is the provision of a user-controlled exposure mechanism that reduces the "trial and error" guesswork of prior art approaches for long exposure time scenes.

Another aspect of the present invention is the provision of a user-controlled exposure mechanism that does not require a light meter that is often utilized by one prior art approach.

According to one embodiment, a digital image capture device (e.g., a digital camera) that has a user-controlled exposure mode is described. The camera has a first button for use by a user to assert a start exposure signal, a second button for use by a user to assert a terminate exposure signal, and a third button for use by a user to set the digital camera into the user-controlled exposure mode. A display is provided for displaying images. The camera includes a user-controlled exposure mechanism that is coupled to the first button, the second button, the third button, and the display. The user-controlled exposure mechanism begins an exposure upon receipt of an asserted start exposure signal and provides visual feedback during the exposure through the display.

Furthermore, the user-controlled exposure mechanism allows a user to either continue an exposure or terminate the exposure by employing the second button.

Consequently, the user-controlled exposure mechanism of the present invention provides feedback (e.g., visual feedback) to the photographer during the exposure of an image, thereby providing the photographer with an opportunity to continue the exposure to capture more light or to terminate the exposure when the camera has captured sufficient light.

According to another embodiment, a digital image capture device (e.g., a digital camera) is provided with a mechanism for supporting a manual exposure mode in which a user can control the exposure time for the picture. A user first places the camera into the manual exposure mode. Then, a user initiates the picture taking process by, for example, depressing a shutter button. The user then reviews the picture on a display as the picture develops. When the picture has the desired exposure, the user terminates the picture taking process by, for example, releasing the shutter button. In this manner, a photographer obtains a picture with the desired exposure without the delay, additional equipment, and guesswork involved in prior art approaches.

Other features and advantages of the present invention will be apparent from the detailed description that follows.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

Figure 1:
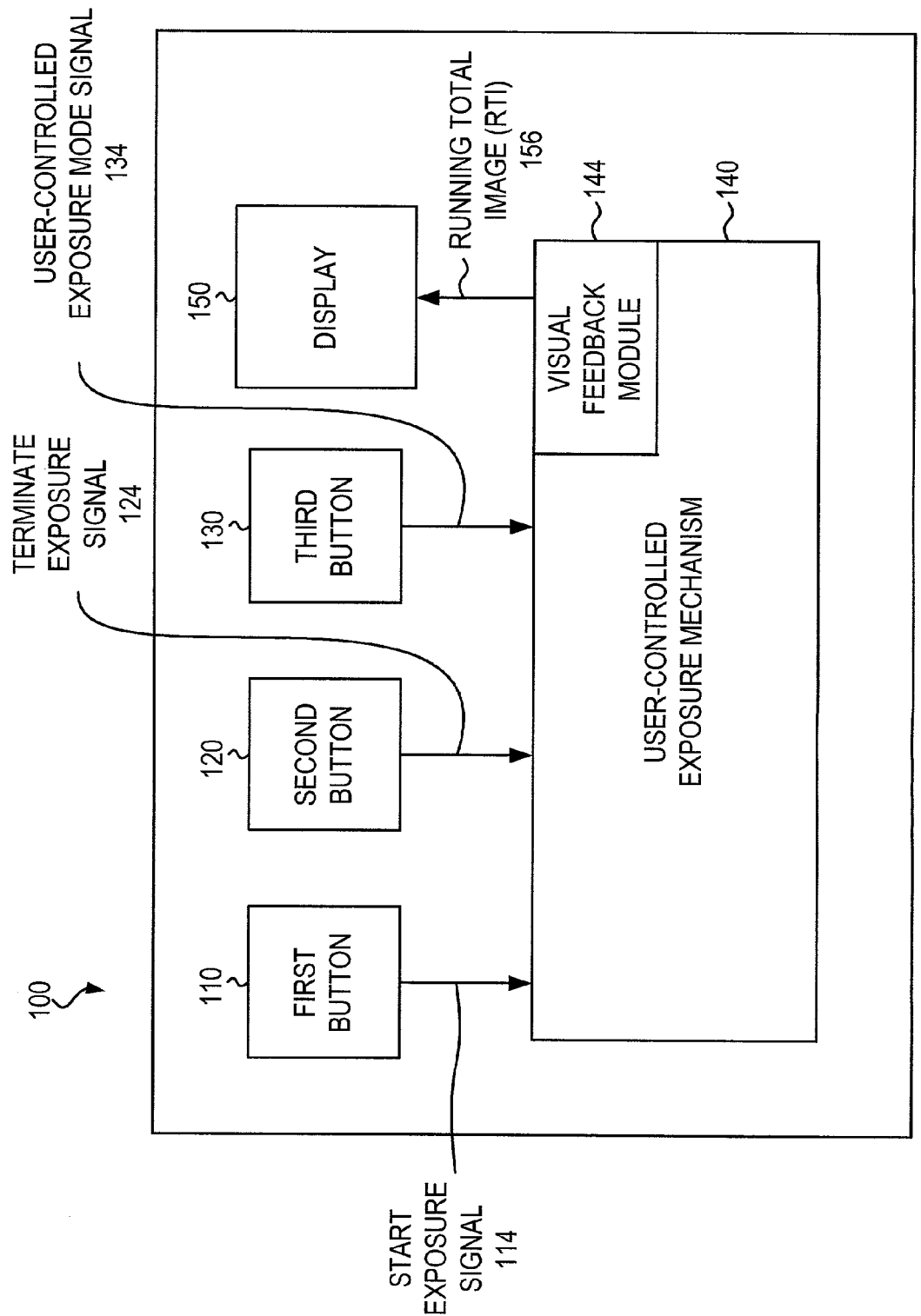
FIG. 1 illustrates a digital image capture device in which the user-controlled exposure mechanism of the present invention may be implemented.

A user-controlled exposure method and system with visual feedback are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

The user-controlled exposure method and system with visual feedback can be implemented in any digital camera architecture that employs an imaging sensor (e.g., a CCD imaging sensor). The photographer accesses this feature by setting the digital camera into a user-controlled exposure mode prior to taking a picture. Once in the user-controller exposure mode, the photographer simply pushes the shutter release button and views the developing scene on the camera's digital display while the exposure is occurring. When the exposure appears correct to the photographer, or the scene is pleasing to the photographer, the photographer simply pushes the shutter button again (or other button as defined by the specific camera design) in order to terminate the exposure. The final image is then stored in the same manner that other standard pictures are stored. An exemplary digital image capture device (e.g., a digital camera) is now described with reference to FIG. 1.

The user-controlled exposure method and system with visual feedback can be implemented in any digital camera architecture that employs an imaging sensor (e.g., a CDD imaging sensor). The photographer accesses this feature by setting the digital camera into a user-controlled exposure mode prior to taking a picture. Once in the user-controller exposure mode, the photographer simply pushes the shutter release button and views the developing scene on the camera's digital display while the exposure is occurring. When the exposure appears correct to the photographer, or the scene is pleasing to the photographer, the photographer simply pushes the shutter button again (or other button as defined by the specific camera design) in order to terminate the exposure. The final image is then stored in the same manner that other standard pictures are stored. An exemplary digital image capture device (e.g., a digital camera) is now described with reference to FIG. 1.

Digital Camera 100

A digital camera 100 includes a first button 110 for use by a user to assert a start exposure signal 114, a second button 120 for use by a user to assert a terminate exposure signal 124; and a third button 130 for use by a user to assert an enable user-controlled exposure mode signal 134, thereby setting the digital camera 100 into the user-controlled exposure mode. It is noted that the first button 110 and the second button 120 can be the same button, such as a shutter control button.

The user-controlled exposure mechanism 140 is coupled to the first button to receive a start exposure signal, to the second button to receive a terminate exposure signal, to the third button to receive the enable user-controlled exposure mode (EUCEM) signal, and to the display 150.

The digital camera 100 includes a user-controlled exposure mechanism (EUCEM) 140 that is activated when the camera is set for a user-controlled exposure mode (UCM). When in the UEM, the user-controlled exposure mechanism 140 begins an exposure upon receipt of an asserted start exposure signal and allows a user to selectively continue an exposure or terminate the exposure by employing the second button 120. The user-controlled exposure mechanism 140 includes a visual feedback module 144 for providing feedback (e.g., visual feedback) to the photographer through a display 150 during the exposure. The user-controlled exposure mechanism 140 is especially adept at handling long exposures (e.g., exposures greater than one or two seconds).

The digital camera 100 also includes a display 150 for displaying images captured by the camera, and as described in greater detail hereinafter, frames in an exposure and running total images (RTIs) 156 that are calculated by the user-controlled exposure mechanism of the present invention. The display 150 can be, for example, a liquid crystal display (LCD) screen for displaying pictures and also graphical user interface for allowing a user to configure the camera or otherwise select options for the display. It is noted that the display can be implemented with technologies, such as cathode ray tubes (CRTs), organic light emitting diodes (OLEDs) and other technologies suitable for portable devices.

Figure 2:
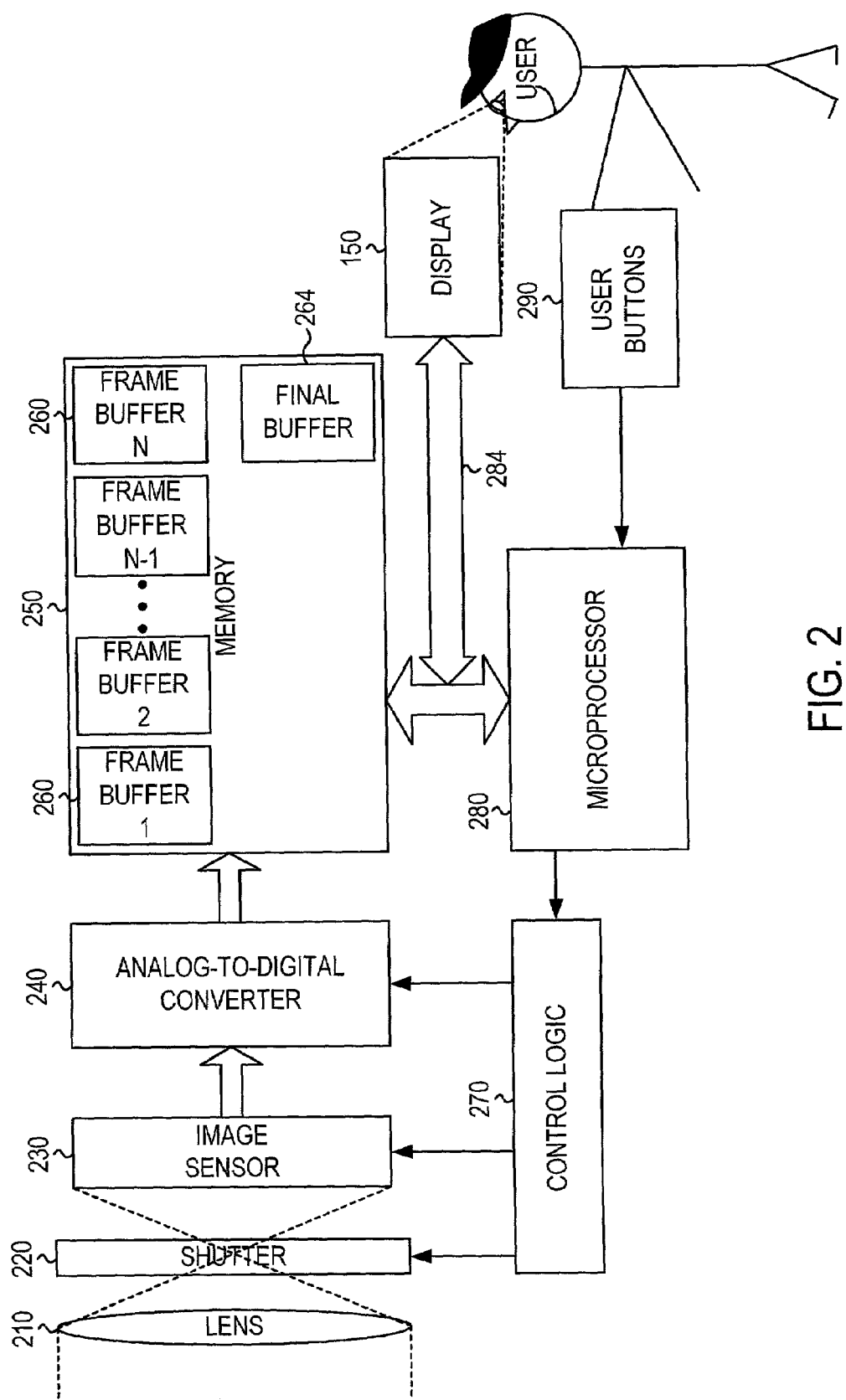
FIG. 2 is block diagram illustrating in greater detail the digital image capture of FIG. 1 in accordance with one embodiment of the present invention.

FIG. 2 illustrates in greater detail the digital image capture device 100 (e.g., a digital camera) of FIG. 1 in accordance with one embodiment of the present invention. The digital camera 100 further includes a lens 210, a shutter 220, an image sensor 230, and an analog/digital converter (A/D converter) 240.

The digital camera 100 also includes a memory 250 for storing a plurality of frame buffers 260 (e.g., frame buffer_1, frame buffer_2, . . . , frame buffer_n) and a final buffer 264. The number of frame buffers 260 depends on factors, such as the size of storage, the predetermined time interval between capture of images. The final buffer 264 stores a final image that is a composite of all the frame buffers (i.e., final buffer data =frame buffer_1 data+frame buffer_2 data+. . . +frame buffer_(n−1) data+buffer_n data).

The digital camera 100 can also include a permanent storage. The storage can be a Flash memory card or other storage device. For example, the camera 100 can include a memory compartment for receiving a memory card for storing pictures. The memory card may be in a standard format, such as Compact Flash, SmartMedia, Memory Stick, and come in a standard size (e.g., 4MB, 8MB, 16MB, 32MB, and 64MB).

The digital camera 100 also includes a processor 280 (e.g., a micro controller) for executing program instructions. In the preferred embodiment, the UCEM 140 of the present invention may be embodied as a program for managing the manual shutter control for long exposures. It is noted that the UCEM 140 can be implemented by software, hardware, firmware, or a combination thereof.

The digital camera 100 also includes a control logic block 270 for controlling the shutter 220, image sensor 230 and the A/D converter 240. The control logic block 270, for example, performs one or more of the following functions:

1. Open the shutter, if necessary;
2. Clock the image sensor so as to capture an image and shift out the analog voltage representation of the image;
3. Clock the Analog to Digital Converter so as to correctly convert the analog voltage into digitally coded data; and
4. Adjust zoom and focus motors (not shown), if applicable, under direction from a microprocessor.

The operation and construction of the control logic block 270 are known by those of ordinary skill in the art and is not described in greater detail herein.

It is noted that shutter 220 is shown as a mechanical shutter. Alternatively, shutter 220 may be implemented with an electronic shuttering mechanism that is integrated with the control logic block 270.

The digital camera 100 also includes a plurality of buttons 290 for use by the user to control the functions of the digital camera. For example, the digital camera 100 can include a menu button, a select button, and a navigation button having an up arrow, left arrow, right arrow, and down arrow. The buttons 290 can include the buttons described earlier that can be utilized by the UCEM 140 of the present invention to place the camera into a user-controlled mode, to start the exposure, and to terminate the exposure.

The terminate exposure signal or close shutter signal, for example, can be asserted by using a cable release or a remote control. In this manner, unwanted vibration of the digital camera that can result from the photographer's touching the camera buttons is prevented. It is noted that the state of a single signal may be used to start or terminate the exposure. For example, the terminate exposure signal may be a de-asserted start exposure signal. In this case, a shutter may be open and closed by asserting or de-asserting a single signal (e.g., the start exposure signal).

For example, a remote control can utilize an infrared (IR) link, radio frequency (RF) link, or other communication link to transmit a command to assert the start exposure signal (e.g., an open shutter signal) and the terminate exposure signal (e.g., a close shutter signal). When the user is satisfied with the amount of exposure of a particular picture, the user simply asserts the terminate exposure signal (e.g., a close shutter signal), and the picture taking process (i.e., the exposure) terminates.

The digital camera 100 also includes a bus 284 for communicating running total image (RTI) to the display 150 and for communicating the frame buffers 260 and running total image (RTI) to the processor 280 for processing.

Processing Steps

Figure 3:
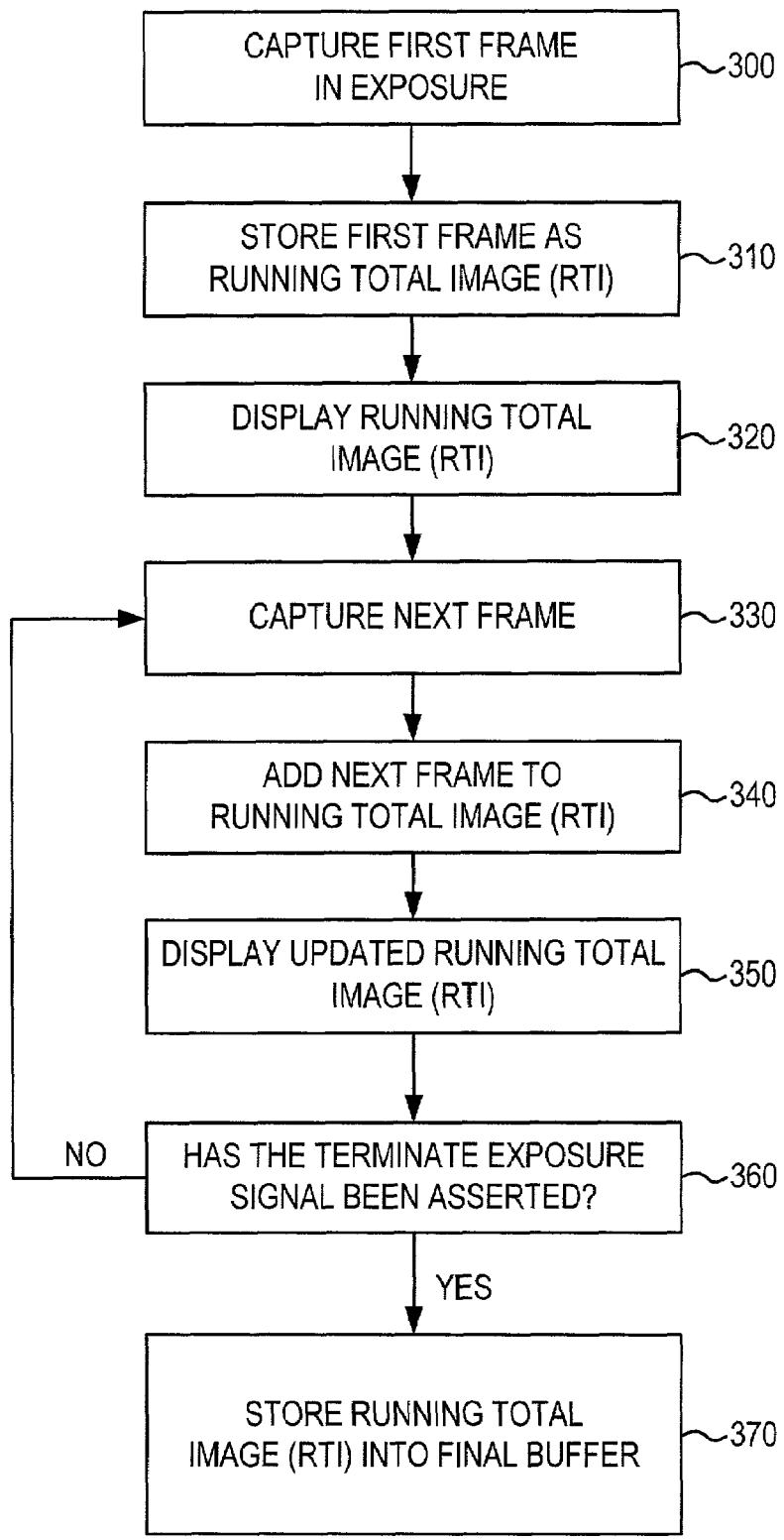
FIG. 3 is a flow chart illustrating the steps performed by the user-controlled exposure mechanism of FIG. 1 in accordance with one embodiment of the present invention.

FIG. 3 is a flow chart illustrating the steps performed by the user-controlled exposure mechanism of FIG. 1 in accordance with one embodiment of the present invention. When the camera is in a user-controlled exposure mode, and the start exposure signal is asserted, the following steps are performed. In step 300, the digital camera 100 captures a first frame in the exposure. The capturing step can include the sub-steps of exposing the image sensor 230, reading out an analog value from the image sensor 230, and converting the captured analog value into a corresponding digital value.

In step 310, the first frame is stored as a running total image (RTI). In step 320, the running total image (RTI), which at this point in time is the same as the first frame, is displayed. For example, the running total image (RTI) can be displayed on a liquid crystal display of the digital camera for viewing by a user. In step 330, a next frame is captured. In step 340, the next frame captured in step 330 is added to the running total image. At this point in time, the running total image (RTI) is the sum of the first frame and the second frame. In step 350, the updated running total image (RTI) is displayed.

In decision block 360, a determination is made whether a terminate exposure signal has been asserted. The terminate exposure signal can be, for example, a close shutter signal or a de-asserted start exposure signal. When the terminate exposure signal has been asserted, the running total image is stored into a final buffer in processing step 370. The value in the final buffer is the sum of all frames captured in the time interval from the start of image capture (e.g., the time when the user presses the shutter button) to the time when the terminate exposure signal is asserted (e.g., when the user releases the shutter button by using a cable release).

Step 370 can also include the sub-step of storing the final image into a storage media (e.g., a volatile memory, a non-volatile memory, or a removable storage media).

When the terminate exposure signal has not been asserted, the processing continues at step 330 for processing the next frame. Steps 330 to 350 are repeated at a predetermined time interval until the terminate exposure signal (e.g., the close shutter signal) is asserted. In this manner, the user-controlled exposure mechanism of the present invention enables a photographer to manually control the exposure time for a picture based on a continuous readout and display of a running total image.

Figure 4:
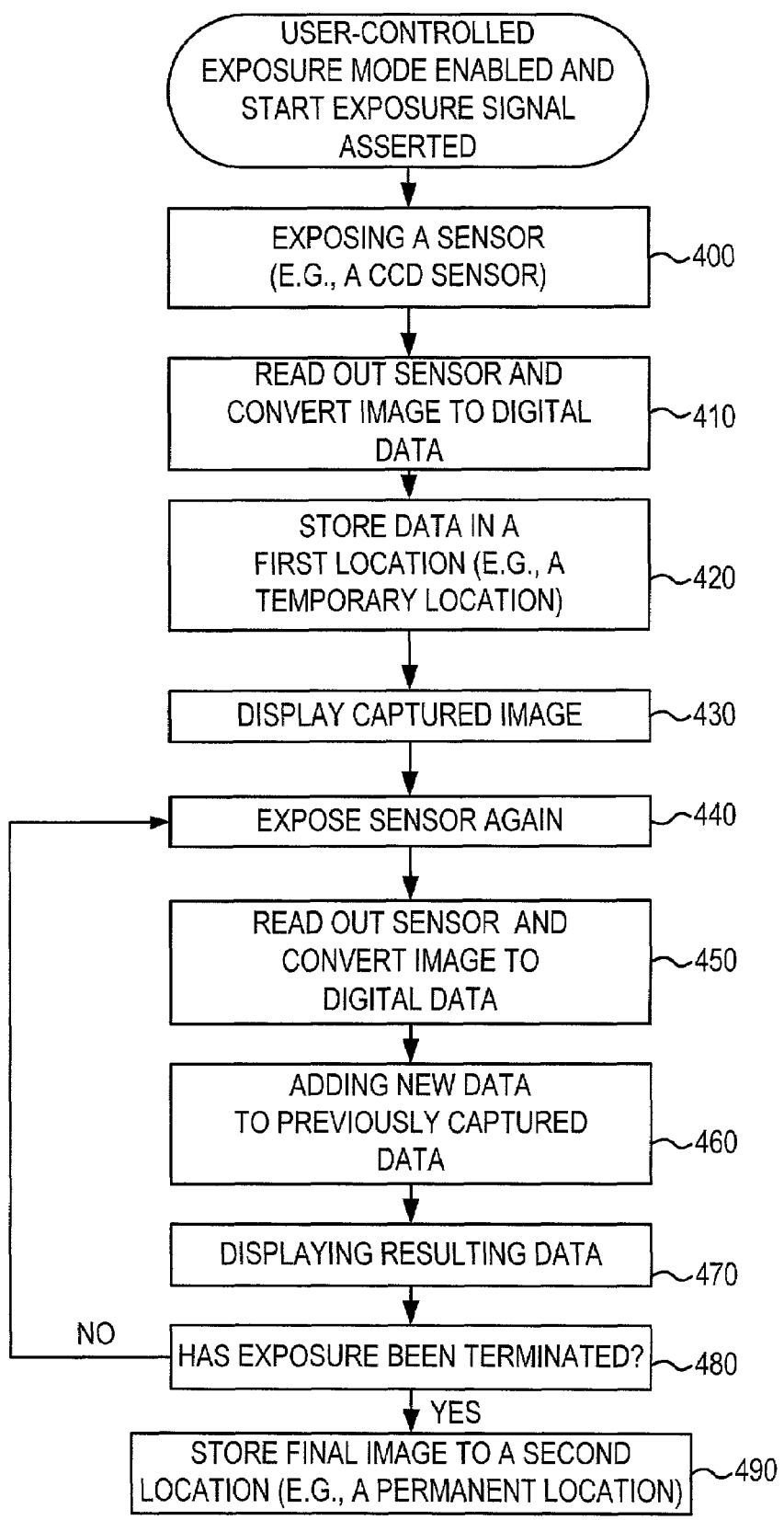
FIG. 4 is a flow chart illustrating the steps performed by the user-controlled exposure mechanism of FIG. 1 in accordance with an alternative embodiment of the present invention.

FIG. 4 is a flowchart illustrating the processing steps performed by an exemplary implementation of the user-controlled exposure mechanism of the present invention in a digital image capture device (e.g., a digital camera). The digital image capture device has a user-controlled exposure mode. When the user-controlled exposure mode is enabled, and the start exposure signal is asserted, steps 400 to 490 are performed. In step 400, a sensor (e.g., a CCD imaging sensor) is exposed. In step 410, the sensor is read out, and the image is converted into digital data. In step 420, the data is stored into a first location (e.g., a temporary location). In step 430, the captured image is displayed on a digital display for viewing by the photographer. In step 440, the sensor is exposed again. In step 450, the sensor is read out, and the new image is converted into digital data. In step 460, the new data is added to the previously captured data. In step 470, resulting data from the addition operation is displayed on the digital display.

In decision block 480, a determination is made whether an exposure terminate signal has been asserted. When the exposure terminate signal has not been asserted, steps 440 to 470 are repeated until the photographer terminates the exposure by, for example, closing the shutter by asserting the terminate exposure signal.

When the exposure terminate signal has been asserted, in step 490, the final image is transferred to a second location (e.g., a permanent location), which can be, for example, a volatile memory, a non-volatile memory, or a removable storage media.

It is noted that steps 440 to 470 can be performed as quickly as allowed by the camera design and is typically a fraction of a second. The user-controlled exposure mechanism of the present invention is especially suited for exposures that last longer than one or two seconds because exposures shorter than about one or two seconds are difficult to control due to human limitations in recognizing a correctly exposed scene and stopping the exposure before too much light is captured.

Figure 5:
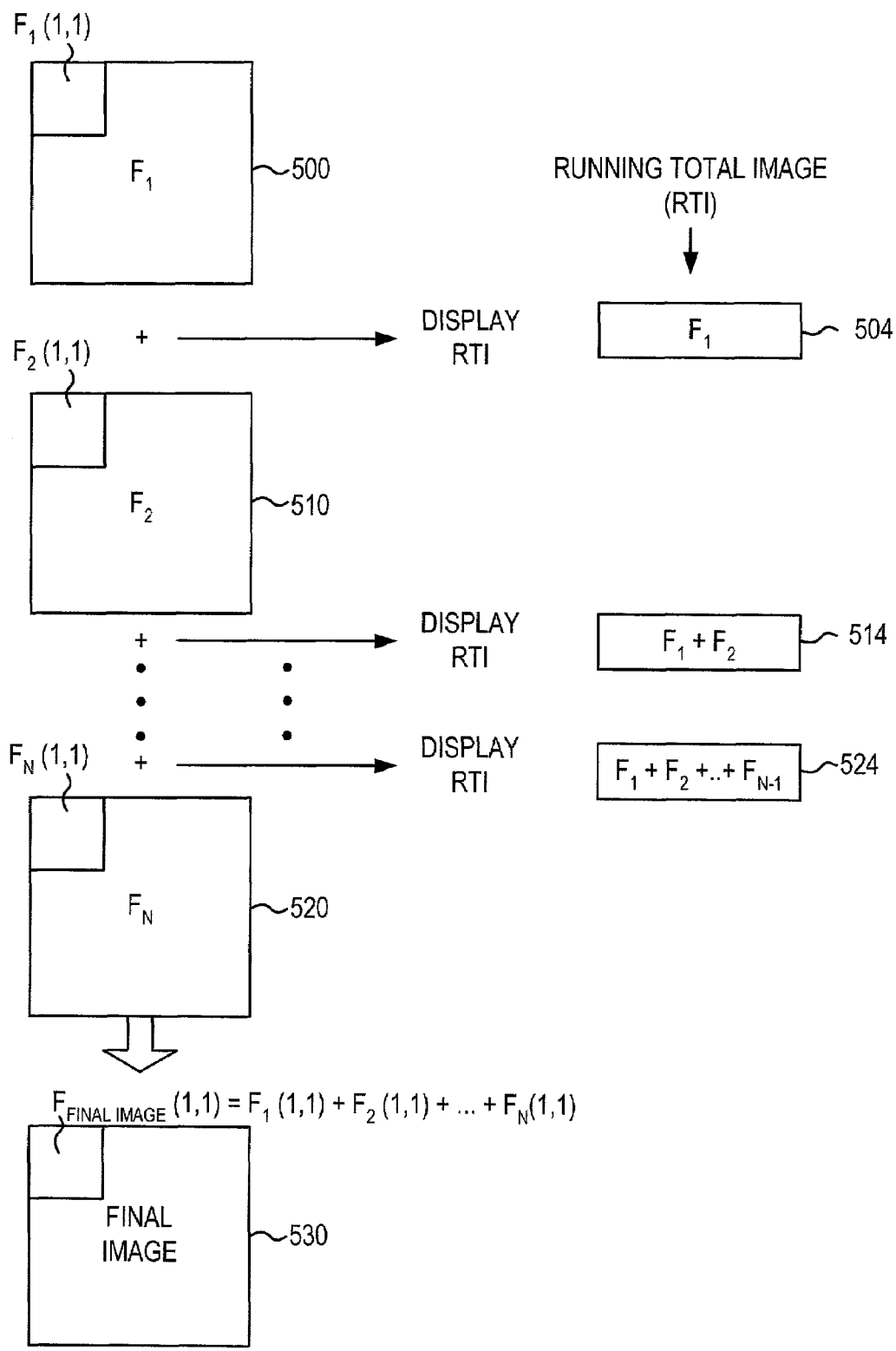
FIG. 5 illustrates exemplary running total images at different stages of an exposure.

FIG. 5 illustrates exemplary running total images at different stages of an exposure. A first frame ($F_1$) 500 is captured. The running total image 504 is then displayed. At this point in time in the exposure, the running total image 504 only includes $F_1$. A second frame ($F_2$) 510 is then captured. The running total image 504 is then displayed. The running total image 514 at this point in time in the exposure includes $F_1$ and $F_2$ and is the sum thereof. Successive frames are captured and displayed in a similar manner.

An Nth frame ($F_N$) 520 is captured. The running total image 524 prior to the capture of the Nth frame 520 includes $F_1, F_2, F_3, \ldots, F_{N-1}$ and is a sum thereof. A final image 530 is the sum of all the frames $F_1$ to $F_N$.

In this embodiment, each pixel can have a value in the range of 0 to 255 or in the range of 0 to 1023. Typically, a zero value represents black (e.g., absence of light or very low light) and the highest value in the range (e.g., 255 or 1023) represents white (e.g., bright light).

However, it is understood by those of ordinary skill in the art that the range of pixel values, which depends on the number bits utilized to represent each pixel, can be varied to suit a particular application. When eight bits are used to represent each pixel, the pixel value can be in the range of 0 to 255. Similarly, when ten bits are used to represent each pixel, the pixel value can be in the range of 0 to 1023. Similarly, when twelve bits are used to represent each pixel, the pixel value can be in the range of 0 to 4096. It is noted that twelve, sixteen, twenty or M bits of data can be used to represent each pixel depending on the requirements of a particular application.

For those scenes that require a long exposure, each successive frame is added to the running total until the displayed version of the scene is acceptable to the user. Specifically, the value at each pixel location is summed across all the frames (1 to N). For example, for the pixel at location (1,1), the final image is the sum of pixel values at location (1,1) across all the frames (i.e., F_total (1,1)=F_1 (1,1)+F_2(1,1)+F_3(1,1)+...+F_N(1,1)).

The user-controlled exposure mechanism of the present invention obviates the need for a light meter, the guesses as to exposure time, and re-takes of a scene after the image review after the fact has revealed inadequate lighting for a picture. The user-controlled exposure mechanism of the present invention provides visual feedback, complete control of the exposure time, and assurance that a scene is captured that meets with the expectations of the photographer.

In the foregoing specification, the invention has been described with reference to specific embodiments thereof. It will, however, be evident that various modifications and changes may be made thereto without departing from the broader scope of the invention. The specification and drawings are, accordingly, to be regarded in an

What is claimed is:

1. A method for controlling exposure time in a digital image capture device comprising the steps of:
   when a user-controlled exposure mode is selected and a start exposure signal is asserted,
   a) capturing a first image and assigning the first image to a running total image;
   b) displaying the running total image;
   c) capturing a next image;
   d) adding the next image to the running total image;
   e) displaying the running total image; and
   f) repeating steps (c) to (e) until a terminate exposure signal is asserted.

2. The method of claim 1 wherein the digital image capture device includes an image sensor; wherein the step of capturing the first image includes the steps of
   $a_{13}1$) exposing the image sensor to light;
   $a_{13}2$) reading out an analog value from the image sensor; and
   $a_{13}3$) converting the analog value to a corresponding digital value; and
   wherein the step of capturing the next image includes the steps of
   $c_{13}1$) exposing the image sensor to light;
   $c_{13}2$) reading out an analog value from the image sensor; and
   $c_{13}3$) converting the analog value to a corresponding digital value.

3. The method of claim 1 wherein the digital image capture device includes a display; and wherein the step of displaying the running total image includes displaying the running total image on the display.

4. The method of claim 1 further comprising the step of: transferring a final image to a storage media.

5. The method of claim 4 wherein the storage media is one of a removable storage media, volatile memory, and non-volatile memory.

6. The method of claim 1 and further wherein:
   the asserted terminate exposure signal is a de-asserted start exposure signal; and
   the start exposure signal is asserted and de-asserted by employing a cable release.

7. The method of claim 1 wherein the step of asserting the start exposure signal includes the step of asserting the start exposure signal by employing a remote control; and wherein the step of asserting the terminate exposure signal includes the step of asserting the terminate exposure signal by employing a remote control.

8. The method of claim 7 wherein the remote control utilizes one of an infrared link, a radio frequency link, and an audio link.

9. The method of claim 7 wherein the digital image capture device is a digital camera.

10. A digital Image capture device that has a user-controlled exposure mode comprising:
    a) a display for displaying images; and
    b) a user-controlled exposure mechanism coupled to the display for:
    i) capturing a first image when a start exposure signal is asserted and assigning the first image to a running total image;
    ii) displaying the running total image on said display;
    iii) capturing a next image;
    iv) adding the next image to the running total image;
    v) displaying the running total image on said display; and
    vi) repeating steps (iii) to (v) until a terminate exposure signal is asserted.

11. The digital image capture device of claim 10 further comprising:
    an enable signal for enabling the user-controlled exposure mechanism and setting the digital image capture device into a user-controlled exposure mode.

12. The digital image capture device of claim 11 further comprising:
    a first button for use by a user to assert the start exposure signal and to assert the terminate exposure signal; and
    a second button for use by a user to assert the enable signal.

13. The digital image capture device of claim 12 further comprising a separate button for use by a user to assert the terminate exposure signal.

14. The digital image capture device of claim 10 wherein the user-controlled exposure mechanism includes:

a visual feedback module for providing visual feedback during the exposure through the display.

15. The digital image capture device of claim 10 wherein the digital image capture device is a digital camera.

16. A digital image capture device that has a user-controlled exposure mode comprising:
   a) means for displaying Images; and
   b) user-controlled exposure means coupled to the display for:
      i) capturing a first image when a start exposure signal is asserted and assigning the first image to a running total image;
      ii) displaying the running total image on said means for displaying;
      iii) capturing a next image;
      iv) adding the next image to the running total image;
      v) displaying the running total image on said means for displaying; and
      vi) repeating steps (iii) to (v) until a terminate exposure signal is asserted.

17. The digital image capture device of claim 16 further comprising:
   an enable signal for enabling the user-controlled exposure mechanism and setting the digital image capture device into a user-controlled exposure mode.

18. The digital image capture device of claim 16 further comprising:
   c) first means for use by a user to assert said start exposure signal;
   d) second means for use by a user to assert said terminate exposure signal; and
   e) third means for use by a user to set the digital image capture device into a user-controlled exposure mode.

19. The digital image capture device of claim 18 wherein the first means and the second means are a single button.

20. The digital image capture device of claim 16 wherein the user-controlled exposure means includes:
   a visual feedback means for providing visual feedback during the exposure through the means for displaying.

* * * * *

UNITED STATES PATENT AND TRADEMARK OFFICE
CERTIFICATE OF CORRECTION

PATENT NO.       : 7,136,101 B2
APPLICATION NO.  : 10/035765
DATED            : November 14, 2006
INVENTOR(S)      : Norman C. Pyle It is certified that error appears in the above-identified patent and that said Letters Patent is hereby corrected as shown below:

On the title page, item (54), in column 1, line 1, delete "USE" and insert -- USER --, therefor.

In column 1, line 1, delete "USE" and insert -- USER --, therefor.

In column 3, lines 44-60, delete "The user-controlled exposure method and system with ................ reference to FIG. 1.".

In column 7, line 50, after "in an" insert -- illustrative rather than a restrictive sense. --.

In column 7, line 67, in Claim 2, delete "$a_{13}1$)" and insert -- $a\_1$) --, therefor.

In column 8, line 1, in Claim 2, delete "$a_{13}2$)" and insert -- $a\_2$) --, therefor.

In column 8, line 3, in Claim 2, delete "$a_{13}3$)" and insert -- $a\_3$) --, therefor.

In column 8, line 7, in Claim 2, delete "$c_{13}1$)" and insert -- $c\_1$) --, therefor.

In column 8, line 8, in Claim 2, delete "$c_{13}2$)" and insert -- $c\_2$) --, therefor.

In column 8, line 10, in Claim 2, delete "$c_{13}3$)" and insert -- $c\_3$) --, therefor.

In column 8, line 37, in Claim 10, delete "Image" and insert -- image --, therefor.

UNITED STATES PATENT AND TRADEMARK OFFICE
CERTIFICATE OF CORRECTION

PATENT NO.       : 7,136,101 B2                                     Page 2 of 2
APPLICATION NO.  : 10/035765
DATED            : November 14, 2006
INVENTOR(S)      : Norman C. Pyle It is certified that error appears in the above-identified patent and that said Letters Patent is hereby corrected as shown below:

In column 9, line 7, in Claim 16, delete "Images" and insert -- images --, therefor.

Signed and Sealed this

Fifth Day of May, 2009

JOHN DOLL
*Acting Director of the United States Patent and Trademark Office*